United States Patent [19]

Lipner et al.

[11] Patent Number: 5,089,978
[45] Date of Patent: Feb. 18, 1992

[54] AUTOMATIC PLANT STATE DIAGNOSIS SYSTEM INCLUDING A DISPLAY SELECTION SYSTEM FOR SELECTING DISPLAYS RESPONSIVE TO THE DIAGNOSIS

[75] Inventors: Melvin H. Lipner, Monroeville; Albert J. Impink, Jr., Murrysville, both of Pa.

[73] Assignee: Westinghouse Electric Corp., Pittsburgh, Pa.

[21] Appl. No.: 479,007

[22] Filed: Feb. 9, 1990

[51] Int. Cl.$^5$ .......................................... G01F 15/06
[52] U.S. Cl. .................................. 364/551.01; 364/188
[58] Field of Search ................... 364/550, 551.01, 554, 364/552, 184, 188, 189; 376/216, 217

[56] References Cited

U.S. PATENT DOCUMENTS

| | | | |
|---|---|---|---|
| 4,552,718 | 11/1985 | Impink, Jr. et al. | 376/216 |
| 4,552,718 | 11/1985 | Impink, Jr. et al. | 376/216 |
| 4,635,214 | 1/1987 | Kasai et al. | 364/551.01 |
| 4,641,248 | 2/1987 | Suzuki et al. | 364/550 |
| 4,644,479 | 2/1987 | Kemper et al. | 364/550 |
| 4,644,479 | 2/1987 | Kemper et al. | 364/550 |
| 4,718,025 | 1/1988 | Minor et al. | 364/550 |
| 4,777,585 | 10/1988 | Kokawa et al. | 364/513 |
| 4,803,039 | 2/1989 | Impink, Jr. et al. | 376/216 |
| 4,815,014 | 3/1989 | Lipner et al. | 364/550 |
| 4,816,208 | 3/1989 | Woods et al. | 376/217 |
| 4,902,469 | 2/1990 | Watson et al. | 376/216 |
| 4,951,234 | 8/1990 | Bellows | 364/550 |

OTHER PUBLICATIONS

Lofti A. Zadeh, Fuzzy Logic, Apr. 1988, pp. 83–93.
P. J. King and E. H. Mamdani, The application of Fuzzy Control, Systems to Industrial Processes, 1977, pp. 235–242, vol. 13.
E. H. Mamdani and B. S. Sembi, Process Control Using Fuzzy Logic, pp. 249–265.
J. C. Taunton, A Rule Based Supervisory Control System, pp. 1–6.
Dr. Kenneth W. Goff, Process Control Applications of Artificial intelligence, pp. 487–507.
P. Martin Larsen, Industrial Applications of Fuzzy Logic Control, pp. 3–10.
B. Knight, R. endersby and V. R. Voller, "The User of Expert System In Industrial Control", *Measurement and Control*, vol. 17, Dec./Jan. 1984/5, pp. 409–413.
J. Maiers and Y. S. Sherif, "Applications of Fuzzy Set Theory", *IEEE Transactions on Systems, Man and Cybernetics*, vol. SMC-15, No. 1, Jan./Feb. 1985.
M. H. Lipner, R. A. Mundy, A. J. Impink, Jr., R. G. Orendi, A Computerized Procedures System For Enhanced Plant Operation, Apr. 1986.
M. H. Lipner, R. A. Mundy, A. J. Impink, Jr., C. E. Meyer, A Computerized Emergency Procedures System For A Pressurized Water Reactor, Sept. 1985.
M. H. Lipner, R. G. Orendi, A. J. Impink, R. A. Mundy, Management and Execution Of Plant Procedures, Sep. 1987.

*Primary Examiner*—Salvatore Cangialosi

[57] ABSTRACT

The present invention is a system that diagnoses plant state in conditions where plant state cannot be precisely determined from sensor signals. If a state is diagnosed with certainty an appropriate plant procedure step display is provided to the operator. If not, the steps corresponding to the likely states are displayed to the operator ranked according to the likelihood of being in that state. The operator can select a step or a time out will result in the highest likelihood step being selected. An appropriate step display is then provided to the operator. The system can also indicate to the operator the consequences of allowing that plant state to continue as well as provide recommendations concerning the currently diagnosed state.

6 Claims, 5 Drawing Sheets

AUTOMATIC PLANT STATE DIAGNOSIS SYSTEM INCLUDING A DISPLAY SELECTION SYSTEM FOR SELECTING DISPLAYS RESPONSIVE TO THE DIAGNOSIS

CROSS-REFERENCE TO RELATED APPLICATIONS

The present invention is related to U.S. Pat. Nos. 4,815,014, 4,803,039, 4,649,515 and 4,644,479, and related to U.S. application Ser. Nos. 07/213,057 entitled "Optically Driven Computer Based Procedures Execution Systems" by Impink et al., 07/307,831 entitled "An Operation State Responsive Automatic Display System" by Impink et al., and 07/156,064 entitled "An Automatic System to Prioritize Repair of Plant Equipment" by Bellows, all incorporated by reference herein.

BACKGROUND OF THE INVENTION

1. Field of the Invention

The present invention is directed to a digital computer based system for diagnosing plant state and selecting information to be presented to an operator of a processing facility as he executes complex operations where the information displayed is dependant on the state diagnosed. More particularly, the invention is directed to a system in which the automatic selection of new displays of information is internally triggered by diagnosed changes in plant state where plant state cannot be unequivocally determined, and that occur as a result of the ongoing operations in which the selection process is guided by the observed sequence of such diagnosed plant state changes.

2. Description of the Related Art

U.S. Pat. Nos. 4,803,039 and 4,815,014 teach a system for computer based monitoring of the execution of complex procedures. Such a system is primarily intended for use under circumstances in which the operator of a complex processing facility is faced with an unusual, potentially adverse situation with little or no prior experience therein. Under such circumstances the operator has little choice but to rely heavily on, and follow closely, pre-planned, written procedures, defined usually by the system's designers, in order to attempt to restore critical system functions. In such cases frequent interaction between the operator and a computer based monitor of procedures execution, such as the system referenced above, is highly desirable if undesirable consequences are to be avoided.

In another class of more commonly encountered operating situations the operator of a complex processing facility performs a nearly routine operation. The start-up after shutdown of a large electrical generating plant, which might typically occur only several times a year, is representative of this class of situations. These situations inevitably involve programmed sequences of changes in the state of the plant. These changes in state may be as pervasive as changes in temperature or pressure of a working fluid or as simple as the opening or closing of a valve, or the starting or stopping of a pump. By ordinary and broadly accepted industry standards and practices such changes in state are monitored and may serve to trigger the next step in the human controlled evolution of the operation being carried out. The operator usually has had prior experience in such situations, but by reason of infrequency of occurrence the operator may not remember every detail of the sequence of operations to be performed. Such situations are not hazardous and in general pose no threat to the health and safety of either the operators or the general public. They are of interest to the owners and managers of the affected facilities because errors made in the execution of the operations can be quite costly in terms of lost production and in equipment damage resulting from incorrect sequencing of consecutive operations.

Written procedures to guide the operator in efficiently executing the desired nearly routine sequence of operations commonly exist in complex processing facilities. Nonetheless, costly operator errors occasionally occur as a result of an operator's misunderstanding of particular parts of the applicable procedure or of inadvertent omission of one or more steps of the procedure. Hence, the use of a computer based system for monitoring the execution of such nearly routine sequences of operations can again offer valuable benefits.

A computer based system for supporting plant operators in carrying out prescribed nearly routine operations is described in U.S. application Ser. No. 07/307,831. The computer based system monitors available plant instrumentation signals and processes the gathered information to detect successive changes in plant state. The system then compares the sequence of observed changes in plant state with a preprogrammed sequence and draws the operators attention to any undesirable deviations from the preplanned sequence by providing appropriate displays on a system monitor. The system requires no input from the operator when the operation underway is following the prescribed sequence and minimal input from the operator when a deviation is detected. The system internally and automatically tracks the evolution of plant states during the nearly routine operations.

In some situations, particularly those for which a clear definition of the plant state cannot be established, the systems described above may not have the capabilities to accurately choose internally among possible current plant states and therefore cannot provide the appropriate procedure related displays to the operator. This is due to the fact that the signals associated with a group of sensors whose readings define the operating state of a system may, because of instrument uncertainties, ambiguities or inadequacies, not produce a clearly identifiable pointer to a particular state. What is needed is a computer based system for machine assisted execution of process operating procedures which determines the plant state from ambiguous sensor readings, provides appropriate displays to the operator and also indicates to the operator the likely consequences of the diagnosed state.

SUMMARY OF THE INVENTION

It is an object of the present invention to diagnose several possible plant states and select either the most likely or the one with the highest negative consequences for attention by an operator.

It is also an object of the present invention to provide a system that will diagnose plant state and indicate the most likely step of a currently applicable sequence of operations.

It is another object of the present invention to monitor the sensor data associated with the diagnosed state to indicate when a state has clearly been reached.

It is also an object of the present invention to provide a system that will alert the operator to the consequences of the diagnosed states along with indicating the possible procedures to follow so the operator can gauge which procedures or steps of procedures may be the most desirable to follow at that time.

The above objects can be attained by a system that diagnoses likely plant states in situations where plant state cannot be precisely determined from the sensor signals, provides an indication to the operator of the most likely state and provides the procedure step displays associated with that most likely state. The system can also indicate to the operator the consequences of allowing that plant state to continue.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
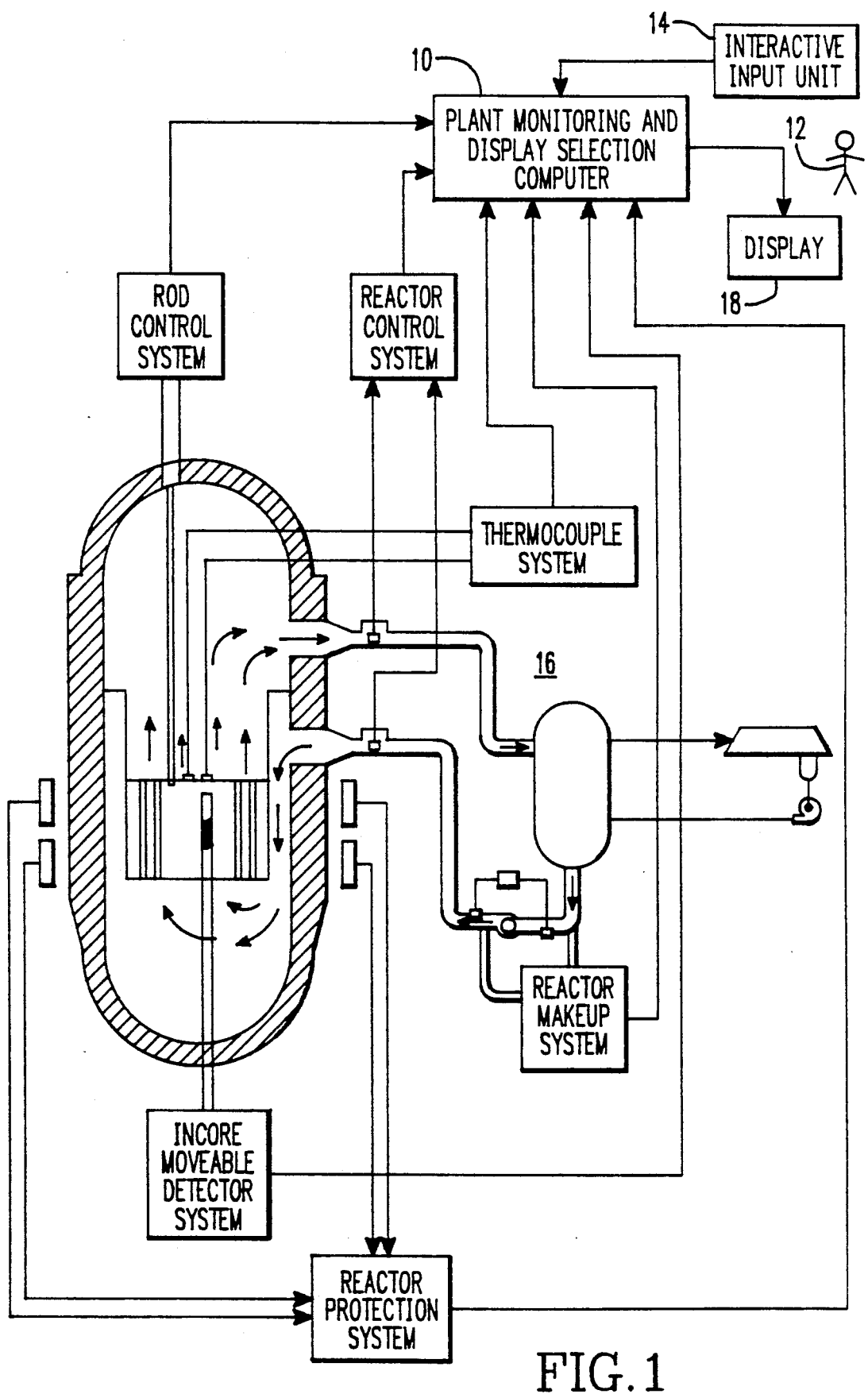
FIG. 1 illustrates a system into which the present invention is incorporated.

The present invention is incorporated into a plant monitoring and machine assisted execution of process operation procedures system with automatic display selection such as described in U.S. Pat. Nos. 4,803,039 and 4,815,014 and U.S. application Ser. No. 07/307,831 and illustrated in FIG. 1. This system is also available from Westinghouse as the COMPRO system. In this type system, a plant operator follows a procedure which will move a plant, such as a nuclear power plant, from one state to another state, for example from a nonpower generating condition to a power generating condition. The movement from one of these conditions follows prescribed steps of the associated procedure. Before a new step can be started all the conditions for completing the previous step must generally be satisfied. For the purposes of this description the satisfaction of the conditions associated with completing a step will be called reaching a plant state while the movement from one overall plant state to another overall plant state, such as nonpower generating to power generating, will be called movement from one plant condition to another plant condition. The plant operator 12 through an interactive input unit 14, such as a keyboard, can provide appropriate inputs to the computer 10 to initialize the monitor process as the plant is started moving from one condition to another in accordance with a prescribed printed procedure or sequence available to the operator or in accordance with an unwritten operation sequence previously learned or developed by the operator or system's designer In either case, the operator, by initiating a system procedure for changing from one plant condition to another, explicitly chooses the operational domain in which the present invention is detecting changes in plant state. In the event that the present invention is itself automatically triggered by the change in state of a plant parameter, then here also the operational domain of relevance or procedure is defined. The operator has the capability of monitoring the sequence of events that occur during the desired change of condition through a display 18. The present invention will allow the operator to proceed with the condition change procedure using other input units such as a plant control board, while the computer 10 automatically monitors plant instrumentation, processes the instrumentation data to detect successive states in the plant condition, diagnoses status changes as the plant changes state, compares the observed status changes to the conditions for the steps corresponding to the plant changes of state of the prescribed change sequence and, by the display 18 and other devices such as an audible annunciator indicates to the operator 12 the likely possible plant states, the likely corresponding plant steps in the procedure and the likely consequences of remaining in those states.

Figure 2:
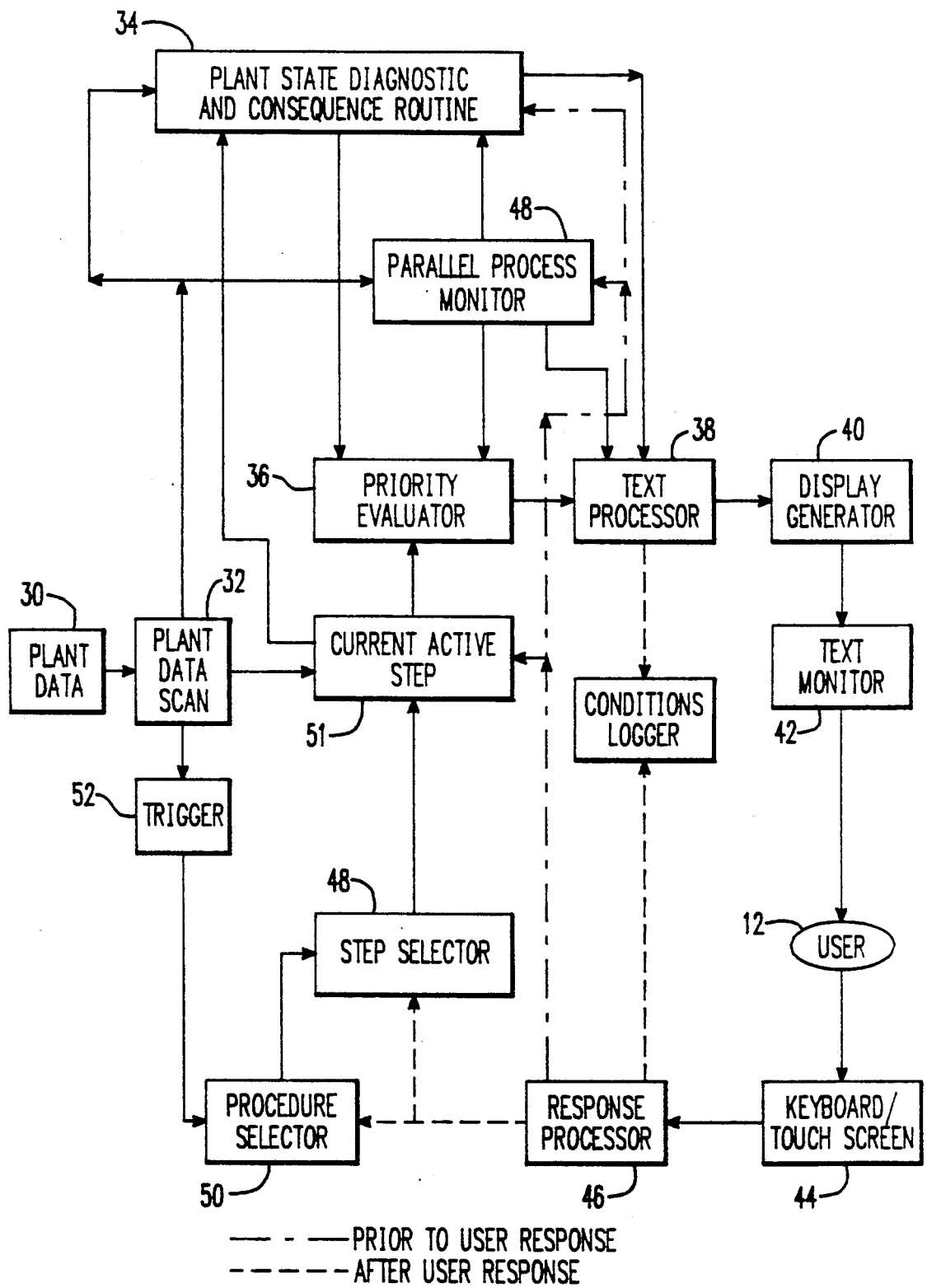
FIG. 2 illustrates the relationship of the diagnosis and consequence evaluator 34 to other processes.

As previously mentioned, problems in determining whether the conditions which determine the completion of a step in a change from one plant state to another plant state are satisfied often arise from the incompleteness of the computer instrumentation database. In the present invention plant data 30 is obtained by a plant data scan routine 32 and provided to a plant state diagnostic and consequence routine 34 as illustrated in FIG. 2. Each time a data scan occurs, the plant state diagnostic portion of the routine 34 determines whether a given plant state is uniquely identifiable and if so provides that state to a priority evaluator routine 36 of the machine assisted execution of process operating procedure system of the related patents and applications. If the plant state is not uniquely identified the routine 34 diagnoses the likely plant states and provides a step vector for a display to the text processor routine 38 which produces a display for a display generator routine 40. As an alternative, the routine 34 could provide the step vector to the priority evaluator 36 which provides the step vector to the text processor 38. This display indicates essentially the probability that the plant is in various states corresponding to particular steps or procedures. The routine 34 accomplishes this by tracking exactly what procedure or sequence is currently relevant. This may be done via manual operator input initializing a sequence or automatically by computer activated triggers built into the system. Here, at anytime, the routine 34 is already in the immediate vicinity of the current plant state and only has to evaluate a limited number of alternative states. The routine 34 also determines the consequences or severity of remaining in the various plant states and provides an appropriate consequence vector for a display to the text processor 38.

The display generator 40 then creates the appropriate displays on a text monitor 42 which is reviewed by the operator 12. The operator has the capability of selecting from among the possible steps (states) using the keyboard 44, thereby designating the state that should be used in any subsequent calculations. While the system is awaiting the operator response, the system continues diagnosing plant states and if a state is identified with certainty the priority evaluator routine 36 is provided with the identified state. If the operator does not respond within a predetermined amount of time the highest probability state is selected and is passed to the evaluator 36. Thus, if either a time-out has occurred or the operator has provided a response, a state and corresponding step is provided to the priority evaluator 36 through the procedure selector 50 or step selector 48.

The plant data is also provided to the parallel process monitor routine 48 which also indicates to the priority evaluator routine 36 whether a particular constraint violation has been identified which is part of the conventional COMPRO system. The monitor 48 is the "normal" constraint monitor of the COMPRO system and provides the priority evaluator routine 36 with a state when it is clearly identified. The routine 34 thus provides the additional capability of telling the operator about possible multiple states. Based on the step inputs the priority evaluator 36 provides an appropriate step display to the user through the text processor 38 with respect to the identified, diagnosed or selected step in the procedure. The user 12 can then respond by providing appropriate inputs to the step selector routine 48 or procedure selector routine 50 for the continuation of the current step operation or the next step operation. These routines pass information to a current active step routine 51 which indicates to the priority evaluator 36 the current active step. This cyclic loop operation continues as the process advances from one procedure step to the next during changes in plant state with the plant state diagnostic and consequence routine 34 providing a state determination whenever a particular plant state cannot be uniquely determined. The operation of routines 32 and 36-56 of FIG. 2 can be found in the descriptions of the COMPRO system described in the related patents and applications and of course the COMPRO package is available from Westinghouse.

Figure 3:
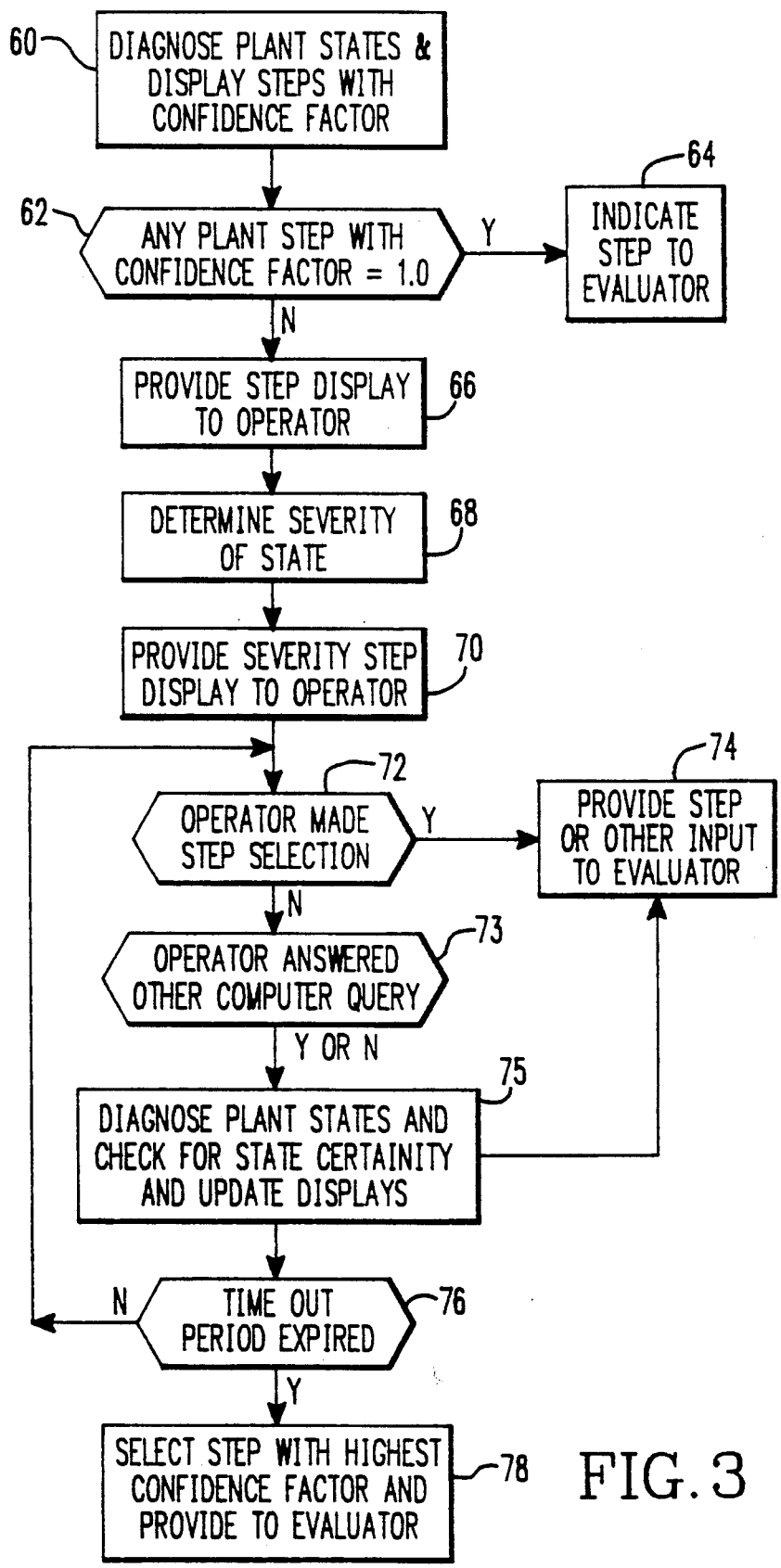
FIG. 3 illustrates the steps of the present invention.

The operations of the plant state diagnostic and consequence routine 34 of FIG. 2 is illustrated in FIG. 3. The first step is to diagnose 60 the possible plant states and produce their associated confidence factors. This can be accomplished by using an expert system such as described in U.S. Pat. Nos. 4,644,479 and 4,649,515 incorporated by reference herein. These patents describe the PDS (Process Diagnosis System) available from Westinghouse Electric Corporation, the preferred system, although many other expert systems capable of diagnosing plant state and providing a confidence in the diagnosis are available and suitable substitutes. This patented PDS expert system diagnoses plant malfunctions based on sensor data. This system can be reconfigured by a person of ordinary skill to diagnose plant states using the same expert system functions that diagnose malfunctions. The invention of the patents can be modified to further refine the diagnosis of plant state by, for example, identifying any malfunctions in sensors. The plant states determine which steps of the procedure being executed are possible. The states with a confidence factor greater than zero in a one-to-one relationship correspond to the steps of the procedure.

Figure 4:
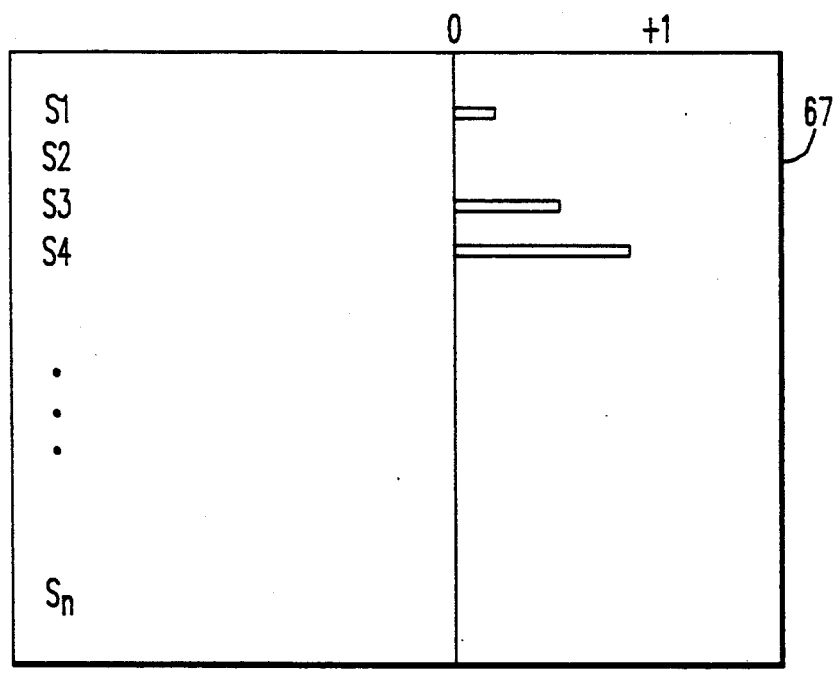
FIG. 4 illustrates a display produced in accordance with the present invention.

Once the plant states and steps are determined the system examines 62 the confidence factors to determine whether any step (state) has a confidence factor of one indicating that the system is in a state which clearly corresponds to a particular step of the procedure. This comparison can be performed by the expert system or by the priority evaluator routine based on a transferred confidence vector. If such a step is discovered by the expert system, it is indicated 64 to the evaluator 36. If such a step is not discovered the system provides 66 a display which shows the confidence factors for the various steps. Once again this display can be provided by passing the confidence vector directly to the text processor 38 or through the evaluator 36 to the text processor. By substituting step number for state, a display 67, as illustrated in FIG. 4, will indicate the confidence factor in the plant being at particular steps corresponding to particular states in the procedure being executed. Next the system determines 68 the severity of the states with positive confidence factors. This severity determination function is performed in accordance with the system described in U.S. application Ser. No. 07/156,064 previously mentioned. For the higher probability states recommended actions such as "Go To Procedure X" can also be provided in association with the severity display. Although this related application is directed to prioritizing the repair of plant equipment, it describes therein how to determine the consequences resulting from a given plant state. The system of the related application ranks the equipment repair based on priority. However, it would be well within the skill of those of ordinary skill to substitute plant state for the equipment being diagnosed and prioritize based on plant state, and thereby rank plant states based on the severity of each of the diagnosed states. The consequences of remaining in the states are also provided by such a system.

Once the list of states is ranked by severity by the expert system or the evaluator 36, a display which is similar to that of FIG. 4 can be provided to the operator along with textual descriptions of the consequences of remaining in the states. A consequence vector could be provided directly to the text processor 38 or through the evaluator 36. The step number again would also be associated with the particular state. Next the routine 34 enters into a time-out loop during which state diagnosis and step checking 75 with display update, as occurred in steps 60-70, is performed. With respect to the system described in 07/307,831, the diagnostic state determination step 75 could be entered after the state checking test (block 112), illustrated in FIG. 6 of U.S. application Ser. No. 07/307,831, is executed and indicates a sequential step has not, in a sequential step progression, been achieved. If a state is detected with certainty the state and step is provided 74 to the evaluator 36. In this loop a test 72 is made to determine whether the operator has designated a particular step or state as the step or state to be used by the priority evaluator 36. If the operator makes a choice 72, the choice is provided 74 to the evaluator 36. The operator could also input 73 other information not necessarily known by the computer. The computer may use this additional information to further refine the prediction of possible likely plant states and alternative actions and the resulting consequences. If the operator has not made a selection and no state is identified with certainty, a time-out test 76 is performed and if a time-out period has expired the step with the highest confidence factor is provided to the evaluator 36. The system then takes this step and in accordance with the teachings of U.S. application Ser. No. 07/307,831 alerts the operator when the changes in the states and steps indicate a deviation from the procedure being performed.

Figure 5:
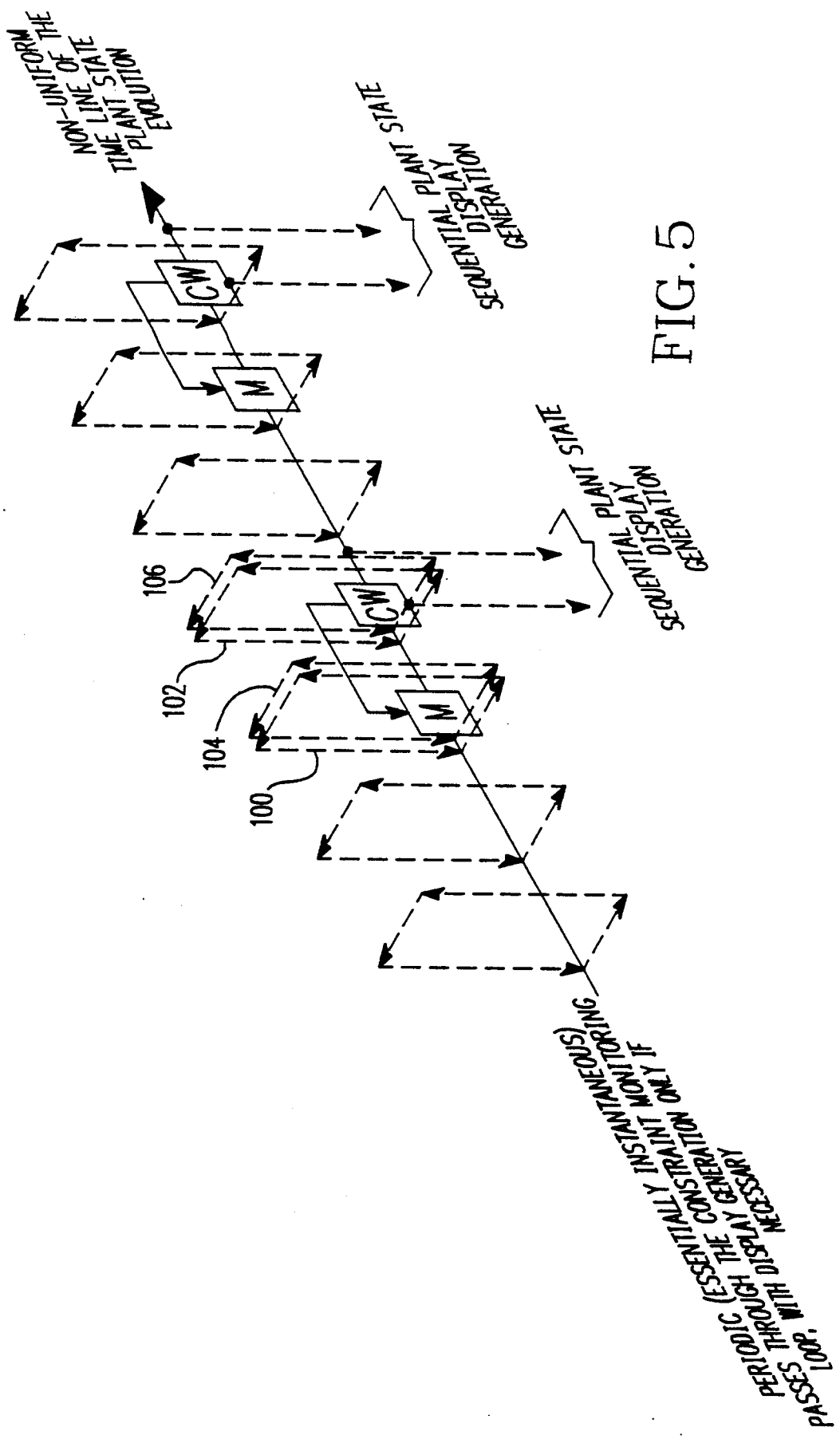
FIG. 5 illustrates how the present invention could fit into the system described in U.S. application Ser. No. 07/307,831.

The relationship of the monitoring loops to other tasks in the sequential step progression represented by block 75 in FIG. 3 is depicted in more detail in FIG. 5. As the system moves through sequential plant states performing constraint monitoring loops 100 and 102, if the states are not determined with certainty parallel expert system monitoring loops 104 and 106 are performed and can run as an independent process to identify the possible states. The loops 104 and 106 are added to specifically handle the extra task of determining uncertain states. The entrance into such an extra loop could occur, for example, at block 164 in FIG. 8 or block 112 of FIG. 6 of the related U.S. application Ser. No. 07/307,831.

Each of the jumps to the diagnostic phase in the present invention is essentially a procedure call from the Fortran of the COMPRO code to the PDS expert system. The return of the plant states and confidence factors is preferably accomplished, as previously mentioned, using a vector in a common database where each vector element includes a step or state number and a confidence factor for the step-confidence factor display, and a step number and severity and consequence description for the step-severity display.

The present invention is thus a system for utilizing expert system diagnostic capability to drive the interactive monitoring of the execution of process operating procedures. The system permits the confidence level associated with an indication of a state (step) of a component or system to be characterized by a value which extends over a continuous range between zero and one. The use of such a system enables the operator to better respond to uncertain and ambiguous situations in which he currently has little experience and receives little guidance. The system also allows the states (steps) to be weighted by the severity of each potential plant state and hence the consequences resulting from remaining in a given plant state may be factored into the guidance provided to the operator, so as to provide a better guide. With such severity and consequence information, an operator would most likely attack a potential problem with dire consequences before one with benign consequences even though the absolute probability of a low consequence event may be somewhat higher. The present system greatly enhances the power and usefulness of a machine assisted execution of process operating procedure system which provides automatic procedure step displays.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, although the present description assumes that the system displays likely steps (states) within an executing procedure (or domain of relevance), the system can also be modified to diagnose which procedure is being executed (or domain of relevance is current) based on plant state to provide the operator with confidence that the plant state has not wandered completely out of the desired procedure.

We claim:

1. A method of monitoring state changes in a process carried out by an operation performed by an operator, comprising the steps of:
    (a) sensing the process and producing sensor values;
    (b) diagnosing states in which the process could reside using a computer and providing a confidence for each state where each state is determined by the sensor values and the confidence is a probability of the existence of the state;
    (c) selecting one of the states and a corresponding operation step using the computer; and
    (d) producing an operation step display for review by the operator using the computer, the operation step display corresponding to the operation step, where the operation step display displays the step in the operation corresponding to the selected state of the process.

2. A method of as recited in claim 1, wherein step (c) comprises the steps of:
    (c1) determining whether any of the states have a confidence factor of one and selecting the state with the confidence factor of one;
    (c2) providing a confidence factor operation step display to the operator with operation steps ranked by confidence factor and designating a state responsive to a step selection by the operator; and
    (c3) designating a state with the highest confidence factor if the operator does not select a step within a predetermined time period.

3. A method as recited in claim 2, wherein step (c2) includes the steps of:
    (c21) determining severity and consequences associated with each diagnosed state; and
    (c22) ranking the operation steps in accordance with severity and providing a severity operation step display to operator.

4. A method as recited in claim 3, further comprising allowing the operator to designate a procedure through which the state changes occur.

5. A method of manufacturing state changes in a process carried out by an operation performed by an operator, comprising the steps of:
    (a) determining whether a plant state can be identified from plant sensor data by diagnosing possible plant states using a computer, where each state is determined by the plant sensor data;
    (b) monitoring plant sensor data changes using the computer and performing step (a) until one of the states is identified; and
    (c) providing an operation step display to the operator corresponding to the identified state using the computer when the state is identified, where the operation step display displays the step in the operation corresponding to the identified state of the process.

6. A system for providing displays to an operator during an operation performed by the operator making state changes to a process, comprising:
    sensors monitoring the process and producing sensor values; and
    a computer connected to said sensors and comprising:
        means for diagnosing states of the operation where each state is determined by the sensor values; and
        means for selecting and providing an operation step display to the operator responsive to the diagnosed states, where the operation step display illustrates the step in the operation corresponding to the diagnosed states of the process.

* * * * *